United States Patent
Cook

(10) Patent No.: US 12,293,067 B2
(45) Date of Patent: May 6, 2025

(54) DIGITAL IMAGE PROCESSING SYSTEMS, METHODS, AND GRAPHICAL USER INTERFACES

(71) Applicant: Canva Pty Ltd, Surry Hills (AU)

(72) Inventor: Christopher James Cook, Wentworth Point (AU)

(73) Assignee: Canva Pty Ltd, Surry Hills (AU)

( * ) Notice: Subject to any disclaimer, the term of this patent is extended or adjusted under 35 U.S.C. 154(b) by 50 days.

(21) Appl. No.: 18/481,175

(22) Filed: Oct. 4, 2023

(65) Prior Publication Data

US 2025/0117123 A1    Apr. 10, 2025

(30) Foreign Application Priority Data

Oct. 5, 2022 (AU) .................. 2022246408

(51) Int. Cl.
| | |
|---|---|
| G06F 3/04845 | (2022.01) |
| G06F 3/04847 | (2022.01) |
| G06T 7/90 | (2017.01) |
| G06T 11/00 | (2006.01) |
| G06T 11/60 | (2006.01) |

(52) U.S. Cl.
CPC ...... *G06F 3/04845* (2013.01); *G06F 3/04847* (2013.01); *G06T 7/90* (2017.01); *G06T 11/001* (2013.01); *G06T 11/60* (2013.01); *G06T 2200/24* (2013.01); *G06T 2207/10024* (2013.01)

(58) Field of Classification Search
CPC ... G06F 3/04845; G06F 3/04847; G06T 7/90; G06T 11/001; G06T 11/60; G06T 2200/24; G06T 2207/10024
See application file for complete search history.

(56) References Cited

U.S. PATENT DOCUMENTS

| | | |
|---|---|---|
| 2008/0062193 A1 | 3/2008 | Olson |
| 2010/0302272 A1 | 12/2010 | Reid et al. |
| 2012/0206475 A1 | 8/2012 | Bryant et al. |
| 2014/0043640 A1 | 2/2014 | Takabayashi et al. |

(Continued)

OTHER PUBLICATIONS

3 Ways to Correct Light Balance in Lightroom, https://www.lightroompresets.com/blogs/pretty-presets-blog/14740581-3-ways-to-correct-white-balance-in-lightroom (last visited Jul. 13, 2022), pp. 1-18.

(Continued)

*Primary Examiner* — Haoshian Shih
(74) *Attorney, Agent, or Firm* — GrowIP Law Group LLC

(57) ABSTRACT

Described herein is a computer implemented method for adjusting an image. The method includes displaying a first adjustment interface that includes including a first adjustment path and a first control for adjusting a first image processing parameter. The first adjustment path is displayed with a first gradient that is determined based on a first value of a second image processing parameter. The method further includes detecting a parameter adjustment that adjusts the first value of the second image processing parameter to a second value of the second image processing parameter and, in response to detecting the parameter adjustment: adjusting the image according to the second value of the second image processing parameter; determining a second gradient for the first adjustment path based on the second value of the second image processing parameter; and updating the first adjustment path to be displayed with the second gradient.

17 Claims, 8 Drawing Sheets
(2 of 8 Drawing Sheet(s) Filed in Color)

(56) References Cited

U.S. PATENT DOCUMENTS

| | | |
|---|---|---|
| 2015/0160800 A1 | 6/2015 | Kuwahara et al. |
| 2015/0310794 A1 | 10/2015 | Gille et al. |
| 2017/0109029 A1 | 4/2017 | Lee et al. |
| 2017/0295351 A1 | 10/2017 | Yamamoto et al. |
| 2018/0130446 A1 | 5/2018 | Guest et al. |
| 2021/0241717 A1 | 8/2021 | Matsui |

OTHER PUBLICATIONS

Examination Report No. 1 for Australian Patent Application No. 2022246408 mailed Jul. 27, 2023, pp. 1-7.
Photoshop colour picker: https://www.dezigneasy.com/2012/03/turn-onoff-dynamic-color-sliders-in.html (last visited Jul. 13, 2022), pp. 1-3.
Screenshot of User Interface from www.canva.com on Jun. 27, 2022, p. 1.
U.S. Appl. No. 29/647,439, p. 15 of application as filed on May 12, 2018, p. 1.
Wikipedia colour temperature p. at https://en.wikipedia.org/wiki/Color_temperature#Correlated_color_temperature (last visited Jul. 14, 2022), pp. 1-20.

DIGITAL IMAGE PROCESSING SYSTEMS, METHODS, AND GRAPHICAL USER INTERFACES

CROSS-REFERENCE TO RELATED APPLICATION

This application is a U.S. Non-Provisional Application that claims priority to Australian Patent Application No. 2022246408, filed Oct. 5, 2022, which is hereby incorporated by reference in its entirety.

TECHNICAL FIELD

Aspects of the present disclosure are directed to systems, methods, and graphical user interfaces for digital image processing.

BACKGROUND

Digital image processing applications typically provide various tools for adjusting the appearance of a digital image. Such tools are typically provided via a graphical user interface (GUI)

For example, many digital image processing applications will provide GUI tools for adjusting the white balance of a digital image—e.g. a tool for adjusting colour temperature and a tool for adjusting tint.

SUMMARY

Described herein is a computer implemented method a computer implemented method for adjusting an image, the method including: displaying the image; displaying a first adjustment interface, the first adjustment interface including a first adjustment path and a first control for adjusting a first image processing parameter, the first adjustment path displayed with a first gradient that is determined based on a first value of a second image processing parameter; and detecting a parameter adjustment that adjusts the first value of the second image processing parameter to a second value of the second image processing parameter; and in response to detecting the parameter adjustment: adjusting the image according to the second value of the second image processing parameter; determining a second gradient for the first adjustment path based on the second value of the second image processing parameter; and updating the first adjustment path to be displayed with the second gradient.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings.

Where different figures include the same or similar features, the same reference numerals are used to indicate those features.

Figure 1:
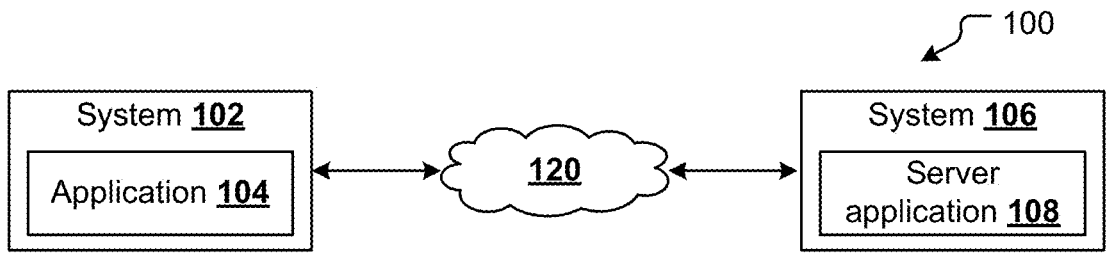
FIG. 1 depicts a computer processing system environment.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is directed to systems, methods, and graphical user interfaces (GUIs) for digital image processing. The techniques described herein may be applied to any digital image, including (for example) digital photographs. Unless stated otherwise, reference to a photograph in this disclosure is reference to a digital photograph and reference to an image is reference to a digital image. Accordingly, (digital) photograph is one type of (digital) image.

Typically, a photograph will originally be created by capturing a scene using a digital camera or by scanning an existing photograph (e.g. a print or a negative of a photograph). A photograph (or, more generally, an image) may be stored in any appropriate image format, e.g. a lossy format (such as JPEG, GIF, or other lossy format), a lossless format (such as TIFF, Bitmap, PNG, or other lossless image format), a raw (RAW) format, or any other appropriate format.

The colours of objects recorded in a photograph can often differ from the colours of those objects as originally perceived by the human eye. This can be due to several factors, such as the mismatch between the human eye sensors and the photograph acquisition sensors, the properties of the display on which the photograph is being shown, and the colour temperature of the light source(s) illuminating the scene of the photograph at the time the photograph is taken.

Such factors can cause an unwanted colour cast to affect a photograph and, for example, render the photograph excessively red (i.e., too warm), blue (i.e., too cool), green, or magenta. An unwanted colour cast can be corrected through a white balancing process (which may also be referred to as grey balancing, neutral balancing, colour balancing, or colour correction).

When correcting an unwanted colour cast, the general goal of a white balancing process is to change the overall colours in a photograph such that a grey object in the scene appears grey in the photograph. The typical consequence of this is that the colours of the rest of the objects captured in the photograph are transformed to appear natural to the human eye.

In some instances, white balancing can also be used for creative purposes—e.g. to change the colours of the photograph for artistic or other effect rather than trying to provide a photograph with its original/natural appearance In certain digital image processing applications, white balancing is performed with reference to two image processing parameters: a colour temperature parameter and a tint parameter.

These parameters are used by the application to modify the appearance of a subject image (e.g. a photograph) through a white balancing algorithm.

A colour temperature value represents the colour of the light emitted by an object or a light source at a specific temperature, is measured in degrees of kelvin (K). Lower kelvin values, e.g. below 3,000K, are typically considered warm colours, such as yellow, orange, and red. Higher kelvin values, e.g. above 4,500K, are typically considered cool colours, which tend to be more blueish.

By way of example, if a photograph is taken in Tungsten light with an associated temperature value of 2,800K, there will typically be more 'warm' colours recorded in the resulting image than a human eye would naturally perceive. To produce a more natural-looking image, an image processing application may be used to correct for this over representation of warm colours in the image by increasing its overall colour temperature. This involves modifying the colour of each pixel of the image.

A colour tint value represents how biased towards green or magenta a colour is. Generally, a higher tint value leads to a more magenta tinted colour, and a lower tint value leads to a greener tinted colour. Adjusting the tint value in the process of white balancing a photograph may be used, for example, where a photograph is taken in artificial lights resulting a tinted light covering the whole photograph.

To facilitate white balance adjustment, some image processing applications provide users with a temperature control (via which a user can adjust the colour temperature of an image) and/or a tint control (via which a user can adjust the tint of an image). When a new temperature or tint value is set, the image processing application uses that value to adjust the image. This involves calculating new pixel values for the image based on the new temperature value or the new tint value and redisplaying the image using those new pixel values. Calculation of the new pixel values is performed according to known white balancing algorithms.

By way of more specific example, some image processing applications provide slider controls for adjusting temperature and/or tint. Generally speaking, a slider control enables a computer user to set a value for a parameter (e.g. tint or temperature) by dragging a handle across a horizontal path.

An issue that arises with white balance adjustments, however, is that it can be difficult for users to anticipate what impact a particular adjustment to tint or temperature may have on the appearance of an image. This difficulty is exacerbated due to the fact that there is an interrelationship between temperature and tint. Specifically, a particular colour adjustment that is caused by changing the temperature will depend on the tint that is currently set, and a particular colour adjustment that is caused by changing the tint will depend on the colour temperature that is currently set. For many users, therefore, the typical approach to white balance adjustment is to experiment with different temperature and tint values to see how different values effect the appearance of the image. As noted however, every white balance adjustment (whether in response to a new temperature value or a new tint value) requires calculating new values for each pixel of the image in question, which requires computational processing resources.

To address these issues—and/or to provide a useful alternative to existing mechanisms for adjusting image white balance—the present disclosure provides mechanisms that provide a user of an image processing application with an indication of how selection of a particular temperature or tint input value will impact the appearance of image being processed (without actually adjusting the image or performing the processing that would be required to do so). To do so, and as described in detail below, the present disclosure provides an adaptive temperature adjustment interface and an adaptive tint adjustment interface.

The adaptive temperature adjustment interface described herein includes a temperature adjustment path that has an appearance that is dynamically determined based on a tint value that has been set. The appearance of the temperature adjustment path is set so that the control provides an indication of how a particular temperature adjustment will impact the appearance of the image being processed.

The adaptive tint adjustment interface described herein includes a tint adjustment path that has an appearance that is dynamically determined based on a temperature value that has been set. The appearance of the tint adjustment path is set so that the control provides an indication of how a particular tint adjustment will impact the appearance of the image being processed.

In the specific embodiments described below, the adaptive temperature and tint controls of the present disclosure are provided with dynamically coloured slide paths. The appearances of the slide paths are dynamically set so that a user is provided with a more accurate indication of the change that will be made to an image by adjusting a specific image processing parameter (e.g., tint) in light of the value of the other image processing parameter (e.g., temperature).

The techniques described herein are computer implemented techniques. With this in mind, FIG. 1 depicts a computer processing system environment 100.

Environment 100 includes a computer processing system 102 that is configured to perform the various functions described herein. Computer processing system 102 may be any suitable type of computer processing system, for example a desktop computer, a laptop computer, a tablet device, a smart phone device, or an alternative computer processing system.

In this example, computer system 102 is configured to perform various functions described herein by execution of a software application 104—that is, instructions that are stored in a storage device (such as non-transient memory 210 described below) that is accessible to the computer system 102 and that are executed by a processing unit of the system 102 (such as processing unit 202 described below).

Application 104 may take various forms, For example, application 104 may be a native/stand-alone image processing application that provides various image processing functions. Alternatively, application 104 may be part of another application (e.g. an add-on or plug-in to that application)—or may be configured to operate with another application—that is also executed on system 102.

By way of further alternative examples, while application 104 is depicted as running on a single computer processing system 102, it may be a distributed application in which the functionality is performed by multiple inter-operating applications that may execute on the same or different computer processing systems. As one example, application 104 may be a client application that communicates (via network 120) with one or more server applications (such as server application 108), and the functionality described herein is jointly performed by the client and server application(s).

In the example of FIG. 1, system 102 is connected to a communications network 120. Via network 120 system 102 can communicate with (e.g. send data to and receive data from) other computer processing systems such as server system 106 (and, in particular with applications running on those systems such as server application 108).

The techniques described herein can, however, be implemented on a stand-alone computer system that does not require network connectivity or communication with other systems.

In FIG. 1, system 102 is depicted as having/executing a single application 104. However, system 102 may (and typically will) include additional applications (not shown). For example, and assuming application 104 is not part of an operating system application, system 102 will include separate operating system application (or group of applications).

FIG. 1 also depicts a server system 106, which is connected to network 120 and can communicate with other computer processing systems over the network 120. Server system 106 runs a server application 108. In client-server embodiments, the server application 108 executes to provide a client application endpoint that is accessible over communications network 120. To do so, the server application 108 may include one or more application programs, libraries, APIs or other software elements that implement the features and functions that are described herein. For example, where server application 108 serves web browser client applications the server application 108 will be a web server which receives and responds to, for example, HTTP requests. Where server application 108 serves native client applications, server application 108 will be an application server configured to receive, process, and respond to specifically defined API calls received from those client applications.

Figure 2:
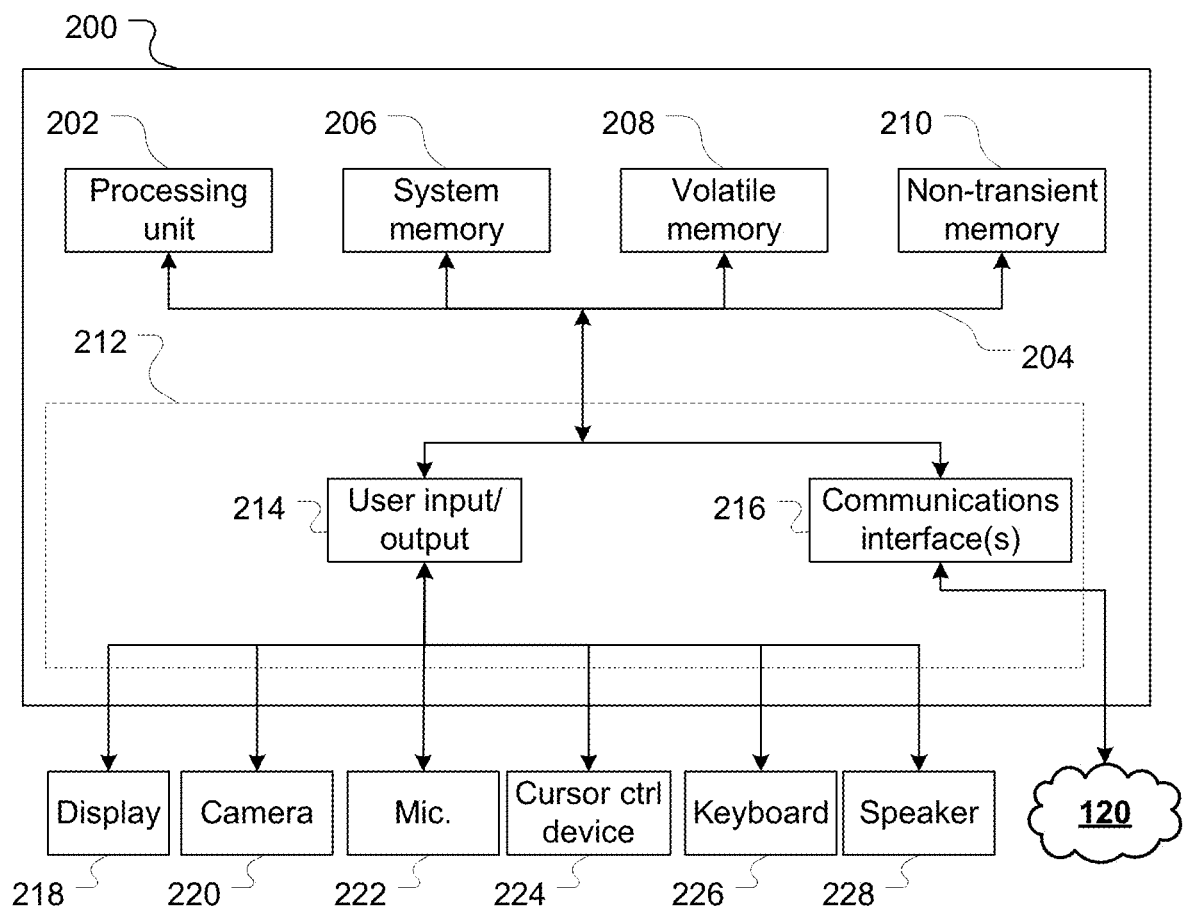
FIG. 2 is a block diagram depicting hardware components of a computer processing system.

Turning to FIG. 2, a block diagram depicting hardware components of a computer processing system 200 is provided. Computer processing systems 102 and/or 106 of FIG. 1 may each be (or include) a computer processing system such as 200 (though alternative hardware architectures are possible).

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage devices (also referred to as memory devices). Computer readable instructions and/or data which are executed by the processing unit 202 to control operation of the processing system 200 are stored on one more such storage devices. In this example system 200 includes a system memory 206 (e.g. a BIOS), volatile memory 208 (e.g. random access memory such as one or more DRAM modules), and non-transient memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: Bluetooth; WiFi; near field communications (NFC); Global System for Mobile Communications (GSM), and/or other wireless connections.

Generally speaking, and depending on the particular system in question, devices to which system 200 connects— whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse (or other cursor control device), trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, in the present disclosure computer processing system 102 will typically be a personal computing device or portable computing device. Where system 200 is a personal computing device such as a desktop or laptop device, it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228. As another example, where system 200 is a portable personal computing device such as a smart phone or tablet it may include a touchscreen display 218, a camera a camera device 220, a microphone device 222, and a speaker device 228.

In the present disclosure, in embodiments that involve computer processing system 106 that system will typically be a server computing device. Where system 200 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 200 also includes one or more communications interfaces 216 for communication with a network, such as network 120 of FIG. 1. Via the communications interface(s) 216, system 200 can communicate data to and receive data from networked systems and/or devices.

System 200 may be any suitable computer processing system, for example, a server computer system, a desktop computer, a laptop computer, a tablet computing device, a smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, in FIG. 1 computer processing system 102 (which may be or include the hardware components of computer processing system 200) includes and executes application 104, and computer processing system 106 (which may be or include the hardware components of computer processing system 200) includes and executes application 108.

In some cases part or all of a given computer-implemented method will be performed by system 200 itself, while in other cases processing may be performed by other devices in data communication with system 200.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 3:
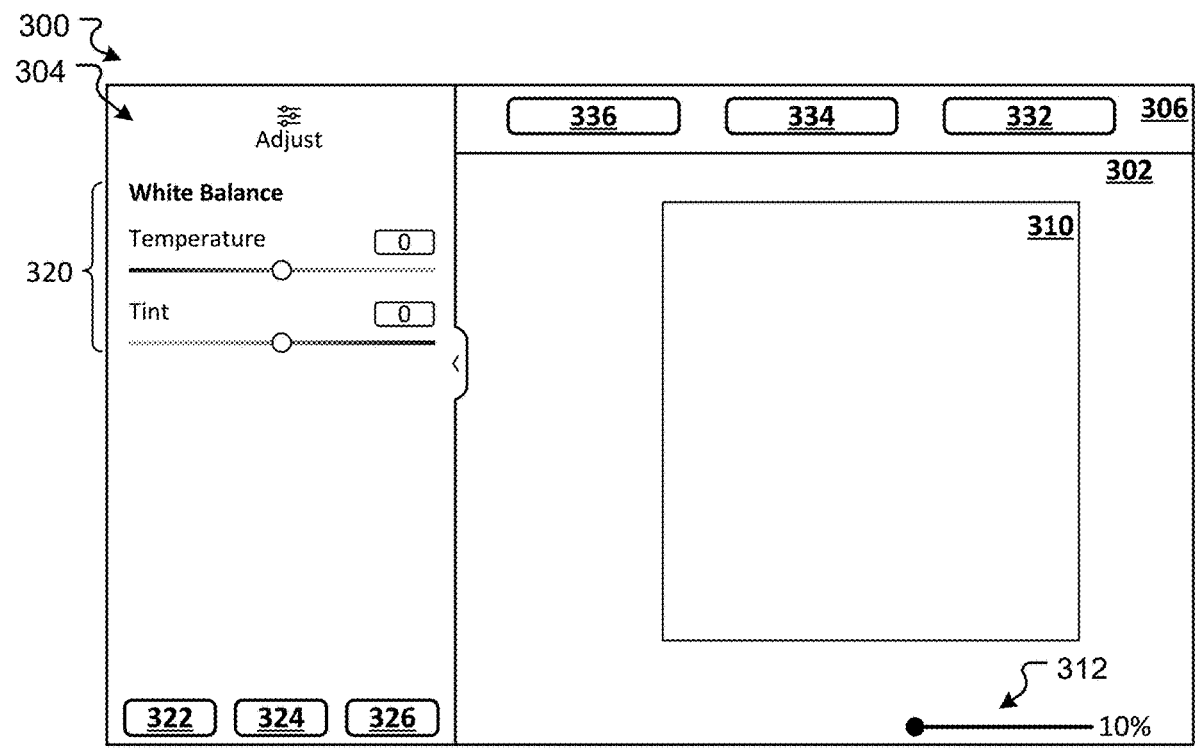
FIG. 3 depicts an example graphical user interface.

Turning to FIG. 3, an example image editing user interface (UI) 300 will be described. In the present example, application 104 causes UI 300 to be displayed on a display of system 102 (e.g. display 218).

In the present example, UI 300 includes a preview region 302, an image adjustments region 304, and a control region 306.

Preview region 302 displays a particular image 310 that is being processed. Application 104 may access the image 310 from any appropriate source. For example, application 104 may access image 310 from locally accessible memory such a non-transient memory 210, from a remote system such as system 106, or from any other available source. In the present example a zoom control 312 is also provided allowing a user to increase/decrease the zoom level applied to the preview 310.

The image adjustments region 304 is used to display image adjustment controls. In the present example, the image adjustment controls include white balance controls 320 (described in detail below), a cancel control 322 (used to cancel any changes made to the image being processed since the last save), an undo control 324 (used to undo the last adjustment made to the image being processed (if any)), and a redo control 326 (used to redo the last adjustment that was undone (if any)). It will be appreciated that an image processing application 104 may provide additional controls for adjusting the appearance of image 310. For example, controls to adjust brightness, contrast, saturation, blur, vignetting, clarity, vibrance, shadows, and/or other parameters may be provided.

In the present example, the control region 306 is used to display additional controls that may be used in the course of image processing. In the present example, these controls include an open image control 332, a save image control 334, and a share image control 336. The open image control 332 may be activated by a user to search and/or browse for an image and open that image. The save image control 334 may be activated by a user to save the image currently being processed (e.g. to locally accessible memory such as 210 and/or a remote location such as via server application 108). The share image control 336 may be activated by a user to share the image that is currently being processed, for example by email, instant message, publication to a social media or other publication service, or an alternative sharing mechanism.

It will be appreciated UI 300 is provided by way of illustrative example only. An image editing application will typically facilitate a wide variety of functions and provide control mechanisms for accessing and using those functions.

Figure 4:
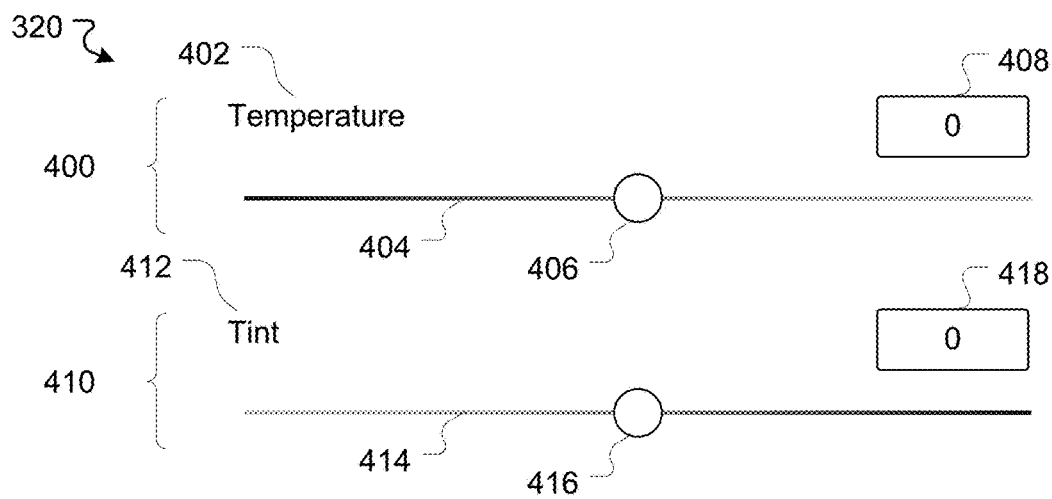
FIG. 4 depicts an example adaptive temperature adjustment interface and an example adaptive tint adjustment interface 410.

Turning to FIG. 4, the white balance controls 320 of UI 300 will be described in further detail. White balance controls 320 include an adaptive temperature adjustment interface 400 and an adaptive tint adjustment interface 410.

The temperature adjustment interface 400 is provided to allow a user to set a temperature input value (which maps to an actual colour temperature, e.g. a kelvin value). Application 104 uses the temperature input value to adjust the image 310 being processed. In the present example, the temperature adjustment interface 400 includes a label 402, a temperature adjustment path 404, a temperature adjustment handle 406, and a temperature adjustment textbox 408.

The label 402 of the temperature adjustment interface 400 displays one or a combination of words to indicate the purpose of or to provide additional information in respect of the temperature adjustment interface 400.

The temperature adjustment path 404 is a path or track along which the temperature adjustment handle 406 can be positioned in order to set a particular temperature input value. Phrased alternatively, each position along path 404 corresponds to a particular temperature input value.

The manner in which a user interacts with the temperature adjustment interface 400 will depend on the input device(s) available. For example, if system 102 includes a touchscreen display (e.g. 218), a user may set a particular temperature input value by either: contacting (e.g. by a tap or dwell input) a particular position on path 404, causing handle 406 to move to that new position; and/or contacting handle 406, dragging handle 406 to a new position on path 404, and releasing handle 406 at that new position. As a further example, if a cursor control device (e.g. 224) is provided, a user may set a particular temperature input value by either: positioning the cursor at a particular position on path 404 and selecting that position (e.g. by activating a button of the cursor control device); and/or selecting handle 406, dragging handle 406 to a new position on path 404, and releasing handle 406 at that new position.

In the present embodiment, the temperature adjustment interface 400 maps the position of the temperature adjustment handle 406 on the temperature adjustment path 404 to a temperature input value of between −1 and 1 (inclusive), where −1 represents the left extremity, 1 represents the right extremity, and 0 represents the centre point of the temperature adjustment path 404. In the present embodiments, a temperature input value of −1 maps to a colour temperature of 8,421 kelvin and a temperature input value of +1 maps to a colour temperature value of 5,298 kelvin. A person skilled in the art will appreciate that other numerical value ranges could be used.

In the present embodiment, temperature adjustment path 404 is a linear path that extends in a horizontal direction. Temperature adjustment path 404 may have an alternative (i.e. non-linear) shape and/or be oriented in a different direction (e.g. vertically or at an angle). Importantly, temperature adjustment path 404 is displayed with an appearance that is determined by application 104 based on the currently set tint value.

The appearance of the temperature adjustment path 404 and its determination is described in detail below with reference to FIGS. 5, 6, and 7. Generally speaking, however, the appearance of the temperature adjustment path 404 is determined so that a user is provided with an indication of the impact that selecting a particular temperature input value (e.g. by positioning the temperature adjustment handle 406 at a particular location along the temperature adjustment path 404) will have on the image 310. To this end, the appearance of the temperature adjustment path 404 is defined by a colour gradient (referred to as the temperature path gradient). The colour gradient results in each position along the temperature adjustment path 404 being displayed (and, therefore, associated) with a particular colour—that particular colour providing an indication of the image adjustment that will be performed if the temperature adjustment handle 406 is positioned at that particular location.

In the example of FIG. 4, temperature adjustment path 404 is depicted with a greyscale gradient. This is not an accurate representation of actual colours that would be used for the temperature adjustment path 404. By way of example, if the current tint value was such that the left hand end of the temperature adjustment path 404 was displayed with a blue colour and the right hand end of the temperature adjustment path 404 was displayed with an orange colour, this would indicate to a user that positioning the temperature adjustment handle 406 at the left hand end of path 404 would cause image 310 to take on a blue colour cast, while positioning the temperature adjustment handle 406 at the right hand end of path 404 would cause image 310 to take on an orange colour cast. Alternatively, if the current tint value was such that the left hand end of the temperature adjustment path 404 was displayed with an indigo colour and the right hand end of the temperature adjustment path 404 was displayed with a pink colour, this would indicate to a user that positioning the temperature adjustment handle 406 at the left hand end of the temperature adjustment path 404 would cause image 310 to take on an indigo colour cast, while positioning the temperature adjustment handle 406 at the right hand end of the temperature adjustment path 404 would cause image 310 to take on a pink colour cast.

In the present example, the temperature adjustment textbox 408 is used to display the temperature input value that is currently set (or a value corresponding thereto)—e.g. a value corresponding to the current position of the temperature adjustment handle 406 on temperature adjustment path 404. In certain embodiments the temperature adjustment textbox 408 may be used only to display the set temperature input (or corresponding) value. In other embodiments, the temperature adjustment textbox 408 may receive/permit input of a value (and allow adjustment of the temperature input value). In other embodiments, the temperature adjustment textbox 408 need not be provided.

If the temperature adjustment textbox 408 is provided, it will display the temperature input value that is currently set (e.g. the value corresponding to the position of the temperature adjustment handle 406 on the temperature adjustment path 404) or a value that corresponds to the temperature input value that is currently set. Furthermore, if the temperature adjustment textbox 408 is configured to receive user input, entry of a valid value into textbox 408 will cause the temperature input value to be set accordingly and, consequently, affect the position of the temperature adjustment handle 406 on the temperature adjustment path 404 through the use of a position determination algorithm. For example, the temperature adjustment textbox 408 may display (and permit entry of) an actual temperature input value (e.g. a value between −1 and 1 inclusive in the present example). Alternatively, the temperature adjustment textbox 408 may display (and permit entry of) a value that maps to an actual temperature input value—e.g. a value of between −100 and 100 which is mapped to an actual temperature input value by dividing by 100.

Tint adjustment interface 410 is similar to temperature adjustment interface 400, excepting tint adjustment interface 410 is provided to allow a user to set a tint input value. Application 104 then uses the tint input value to adjust the image 310 being processed. In the present example, the tint adjustment interface 410 includes a label 412, a tint adjustment path 414, a tint adjustment handle 416, and a tint adjustment textbox 418.

The label 412 of the tint adjustment interface 410 displays one or a combination of words to indicate the purpose of or to provide additional information in respect of the tint adjustment interface 410.

The tint adjustment path 414 is a path or track along which the tint adjustment handle 416 can be positioned in order to set a particular tint input value. Phrased alternatively, each position along path 414 corresponds to a particular tint input value.

The manner in which a user interacts with the tint adjustment interface 410 will depend on the input device(s) available, and may be the same as (or similar to) the interactions described above with reference to the temperature adjustment interface 400.

In the present embodiment, the tint adjustment interface 410 maps the position of the tint adjustment handle 416 on the tint adjustment path 414 to a tint input value of between −1 and 1 (inclusive), where −1 represents the left extremity, 1 represents the right extremity, and 0 represents the centre point of the temperature adjustment path 404.

In the present embodiment, tint adjustment path 414 is a linear path that extends in a horizontal direction. Tint adjustment path 414 may have an alternative (i.e. non-linear) shape and/or be oriented in a different direction (e.g. vertically or at an angle). Importantly, tint adjustment path 414 is displayed with an appearance that is determined by application 104 based on the currently set temperature value.

The appearance of the tint adjustment path 414 and its determination is described in detail below with reference to FIGS. 8 and 9. Generally speaking, however, the appearance of the tint adjustment path 404 is determined so that a user is provided with an indication of the impact that selecting a particular tint input value (e.g. by positioning the tint adjustment handle 416 at a particular location along the tint adjustment path 414) will have on the image 310. To this end, the appearance of the tint adjustment path 414 is defined by a colour gradient (referred to as the tint path gradient). The colour gradient results in each position along the tint adjustment path 414 being displayed (and, therefore, associated) with a particular colour—that particular colour providing an indication of the image adjustment that will be performed if the tint adjustment handle 416 is positioned at that particular location.

In the example of FIG. 4, tint adjustment path 414 is depicted in greyscale. This is not an accurate representation of actual colours that would be used for the tint adjustment path 414. By way of example, if the current temperature value was such that the left hand end of the tint adjustment path 414 was displayed with a green colour and the right hand end of the tint adjustment path 414 was displayed with an purple colour, this would indicate to a user that positioning the tint adjustment handle 416 at the left hand end of path 414 would cause image 310 to take on a green colour cast, while positioning the tint adjustment handle 416 at the right hand end of path 414 would cause image 310 to take on a purple colour cast. Alternatively, if the current temperature value was such that the left hand end of the temperature adjustment path 414 was displayed with an aqua colour and the right hand end of the tint adjustment path 414 was displayed with a blue colour, this would indicate to a user that positioning the tint adjustment handle 416 at the left hand end of the tint adjustment path 414 would cause image 310 to take on an aqua colour cast, while positioning the tint adjustment handle 416 at the right hand end of the temperature adjustment path 414 would cause image 310 to take on a blue colour cast.

In the present example, the tint adjustment textbox 418 is used to display the tint input value that is currently set (or a value corresponding thereto)—e.g. a value corresponding to the current position of the tint adjustment handle 416 on tint adjustment path 414. In certain embodiments the tint adjustment textbox 418 may be used to only display the set tint input (or corresponding) value. In other embodiments, the tint adjustment textbox 418 may receive/permit entry of a value (and allow adjustment of the tint input value). In other embodiments, the tint adjustment textbox 418 need not be provided.

If the tint adjustment textbox 418 is provided, it will display the tint input value that is currently set (e.g. the value corresponding to the position of the tint adjustment handle 416 on the tint adjustment path 414) or a value that corresponds to the tint input value that is currently set. Furthermore, if the tint adjustment textbox 418 is configured to receive user input, entry of a valid value into textbox 418 will cause the tint input value to be set accordingly and, consequently, affect the position of the tint adjustment handle 416 on the tint adjustment path 414 through the use of a position determination algorithm. For example, the tint adjustment textbox 418 may display (and permit entry of) an actual tint input value (e.g. a value between −1 and 1 inclusive in the present example). Alternatively, the tint adjustment textbox 418 may display (and permit entry of) a value that maps to an actual tint input value—e.g. a value of between −100 and 100 which is mapped to an actual tint input value by dividing by 100.

As will be appreciated from the above, the adaptive temperature adjustment control 400 of the present disclosure provides a user with an indication of the impact that a given temperature adjustment will have on the image being processed. Similarly, the adaptive tint adjustment control 410 of the present disclosure provides a user with an indication of the impact that a given tint adjustment will have on the image being processed.

This is in contrast to existing image processing applications which do not provide users with such indications.

While some existing image processing applications provide slider-type controls for adjusting temperature and tint values, these controls are provided with a fixed appearance. As a result, a user is not provided with an indication as to the nature of the changes that will be made to an image when adjusting tint or temperature. To determine how a temperature or tint adjustment will impact an image, therefore, the user must actually perform the adjustment (and incur the computational processing overheads this requires).

To illustrate this, consider an image processing application that provides a slider-type temperature control that is displayed with a fixed set of colours along its length—e.g. from blue at one end to yellow at the other end. A user of such an application will naturally assume that positioning the temperature slider handle at the blue end of the path will adjust the image to have a bluer appearance, while positioning the temperature slider handle at the yellow end of the path will adjust the image to a yellower appearance. Depending on the current tint value and image properties, however, this may not be correct. For example, and depending on the tint input value and other image properties, it is possible that positioning the temperature slider handle at the "blue" end of the path may in fact adjust the image to have a purple appearance, while positioning the temperature slider handle at the "yellow" end of the path may in fact adjust the image to a pink appearance.

In a similar vein, consider an image processing application that provides a slider-type tint control that is displayed with a fixed set of colours along its length—e.g. from green at one end to pink at the other end. A user of such an application will naturally assume that positioning the tint slider handle at the green end of the path will adjust the image to have a greener appearance, while positioning the tint slider handle at the pink end of the path will adjust the image to a pinker appearance. Depending on the current temperature value and other image properties, however, this too may be incorrect. For example, and depending on the temperature input value and other image properties, it is possible that positioning the tint slider handle at the "green" end of the path may in fact adjust the image to have a yellow appearance, while positioning the tint slider handle at the "purple" end of the path may in fact adjust the image to a red appearance.

Figure 5:
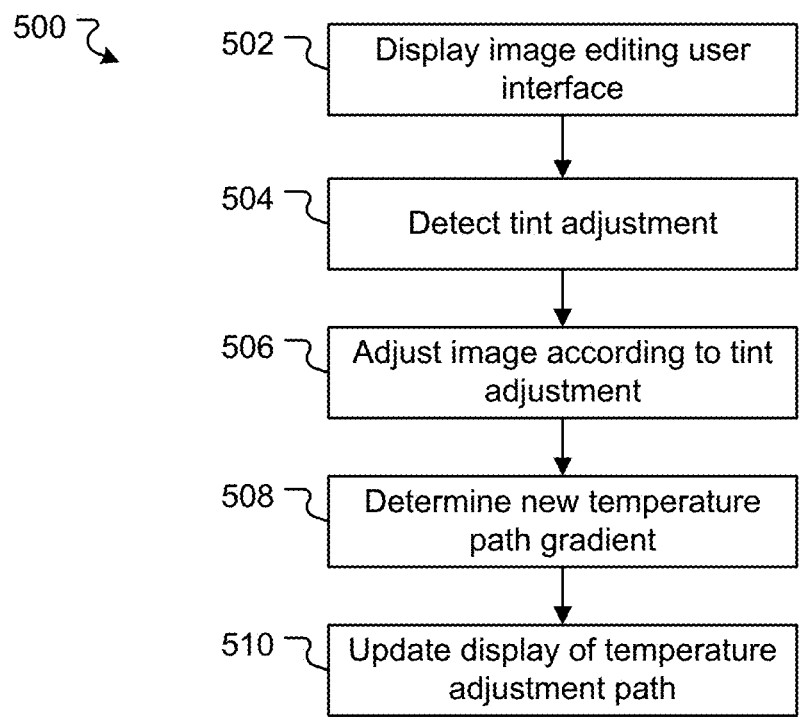
FIG. 5 is a flowchart depicting processing involved in displaying an adaptive temperature adjustment control.
Figure 6:
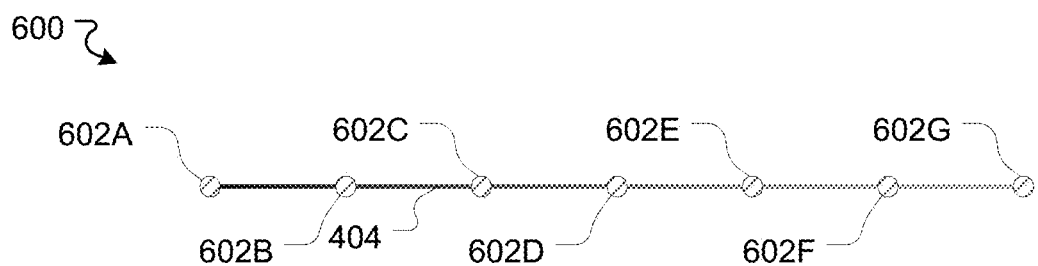
FIG. 6 depicts a gradient with gradient control points.

Turning to FIG. 5, a computer implemented method 500 for displaying an adaptive temperature adjustment interface will be described. Method 500 will be described as being performed by application 104. Method 500 will be described with reference to GUI 300 as described above to illustrate various user interface components.

At 502, application 104 displays an image editing UI such as UI 300 described above. In the present example, displaying the image editing UI includes displaying the image 310 that is being processed and displaying an adaptive temperature adjustment interface 400.

The adaptive temperature adjustment interface 400 includes a temperature adjustment path (e.g. path 404). At 502, application 104 displays the temperature adjustment path with an initial temperature path gradient (which may be referred to as a first temperature path gradient). The initial temperature path gradient is based on an initial tint value (which may be referred to as a first tint value). The initial tint value may be determined in various ways. For example, the initial tint value may be: a default tint value; a tint value that application 104 is configured to automatically calculate based on the image 310 being processed; or a tint value that a user has set in previous adjustment operations performed on the image 310 that is being processed.

Where the initial tint value is a default tint value, the initial temperature path gradient may be a default temperature path gradient that corresponds to that tint value (or that application 104 determines based on the initial tint value, e.g. as described below). If the initial tint value is not a default tint value, application 104 may determine the initial temperature path gradient based on the initial tint value (e.g. as described below) before the temperature adjustment path 404 can be completely displayed.

At 504, application 104 detects a tint adjustment that changes the initial tint value to a new tint value (which may be referred to as a second tint value). Various tint adjustments are possible. For example, application 104 may automatically perform the tint adjustment based on processing performed on the image 310 or responsive to other image adjustments that are performed by a user. Additionally, or alternatively, the tint adjustment may be the result of user interaction with a tint adjustment interface such as 410 described above. User interaction with tint adjustment interface may include, for example, user input that repositions the tint adjustment handle 416 on the tint adjustment path 414 or user input that enters a new tint input value into the tint adjustment textbox 418.

At 506, in response to detecting the tint adjustment, application 104 adjusts the image according to the new tint value. Adjustment of the image based on a particular tint value may be performed in accordance with known white balancing techniques. Generally speaking, this may involve mapping a positive or negative tint towards or away from a magenta focal point by a defined distance (e.g. $\frac{1}{12}^{th}$ or $\frac{1}{6}$ or an alternative distance) to determine an adjusted colour. The adjusted colour is then mapped to white (and other colours are correspondingly mapped to values other than white) using a chromatic adaptation algorithm such as the Von Kries algorithm or the Bradford algorithm which operate to map a certain colour to grey, and to map other colours in a way such that their relationship to the white point is maintained.

At 508, also in response to detecting the tint adjustment, application 104 determines a new temperature path gradient (which may be referred to as a second temperature path gradient). The new temperature path gradient is determined based on the new tint value. Determination of a temperature path gradient based on a particular tint value is described below with reference to FIG. 7.

At 510, following determination of the new temperature path gradient, application 104 updates the temperature adjustment path 406 so it is displayed with the new temperature path gradient.

In the present embodiments, a path gradient is defined by a plurality of gradient control points—specifically, an ordered set of gradient control points. In these embodiments, application 104 updates the temperature adjustment path 406 by applying the gradient control points evenly across the temperature adjustment path 406 in order. For example, the path gradient may be in a form such as the following (where CPx defines a control point colour, e.g. as an sRGB hex value format):

[CP1, CP2, CP3, CP4, CP5, CP6, CP7]

In this case, application 104 displays the temperature adjustment path 406 so that (from left to right): the leftmost end of path 406 is displayed at CP1; approx. 16.6% of the way along path 406 is displayed at CP2; approx. 33.2% of the way along path 406 is displayed at CP3; approx. 50% of the way along path 406 is displayed at CP4; approx. 66.4% of the way along path 406 is displayed at CP5; approx. 83% of the way along path 406 is displayed at CP6; and the rightmost end of path 406 is displayed at CP7. Application 104 then interpolates between adjacent pairs of control points to display a continuous gradient along the entirety of the temperature adjustment path 406.

At 508 above, application 104 determines a temperature path gradient based on a particular tint value. In the present embodiment, application 104 determines a gradient by calculating display colours for a plurality of gradient control points. Each gradient control point is ultimately associated with a particular position on the temperature adjustment path 404.

In the present embodiments, the plurality of control points is generated as an ordered set of control points (with each control point's ultimate position determined with reference to its position in the ordered set). In alternative embodiments, each control point may instead be associated with explicit position information (e.g. a percentage or other value that indicates the control point's position).

More specifically, in the present embodiment application 104 is configured to define the temperature path gradient using seven control points. FIG. 6 depicts an example of this, showing a gradient 600 that is defined by seven equidistant control points 602A to 602G. In FIG. 6 control points 602 are indicated with visible circles, however control points will not typically be explicitly displayed.

As noted above, in the present embodiments the temperature adjustment path 404 represents a range of temperature input values of between −1 and 1 (inclusive). The table below indicates the temperature input value that each gradient control point 602 maps to along with the physical position of the control point 602 on the temperature adjustment path 404 (in this instance expressed as a % of the path's total length):

| Control point | Corresponding temperature input value | Position of control point along temperature adjustment path 404 (L to R) |
|---|---|---|
| 1 (602A) | −1 | 0% |
| 2 (602B) | −0.667 | 16.66% |
| 3 (602C) | −0.333 | 33.33% |
| 4 (602D) | 0 | 50% |
| 5 (602E) | 0.333 | 66.66% |
| 6 (602F) | 0.667 | 83.33% |
| 7 (602G) | 1 | 100% |

While the present embodiments use seven gradient control points to define a temperature path gradient, it will be appreciated that application 104 may be configured to define a temperature path gradient by an alternative number of control points.

Figure 7:
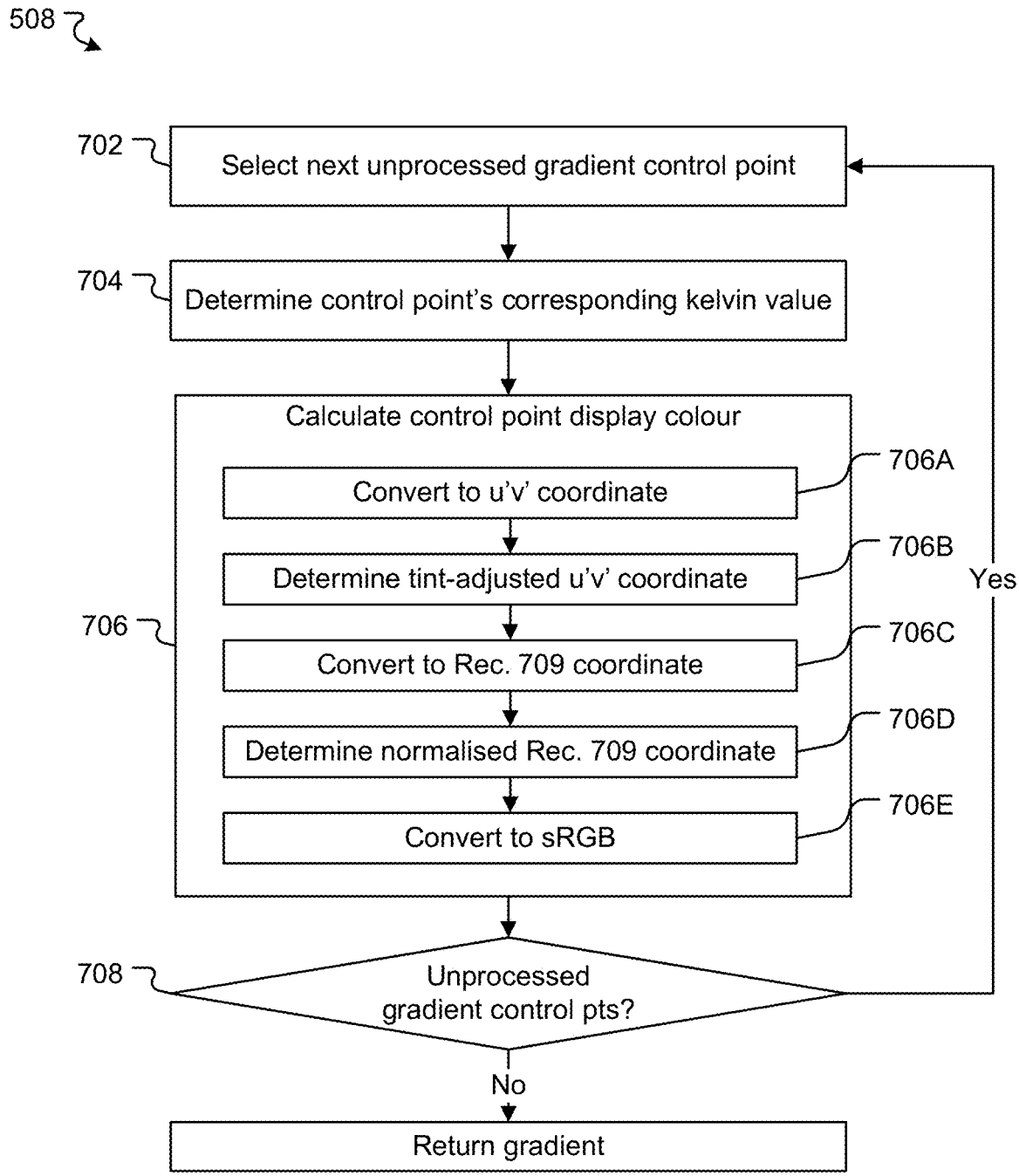
FIG. 7 is a flowchart depicting processing involved in determining a temperature path gradient.

Turning to FIG. 7, example processing performed by application 104 to determine a temperature path gradient based on a particular tint value (as performed, for example, at 508) will be described.

Figure 9:
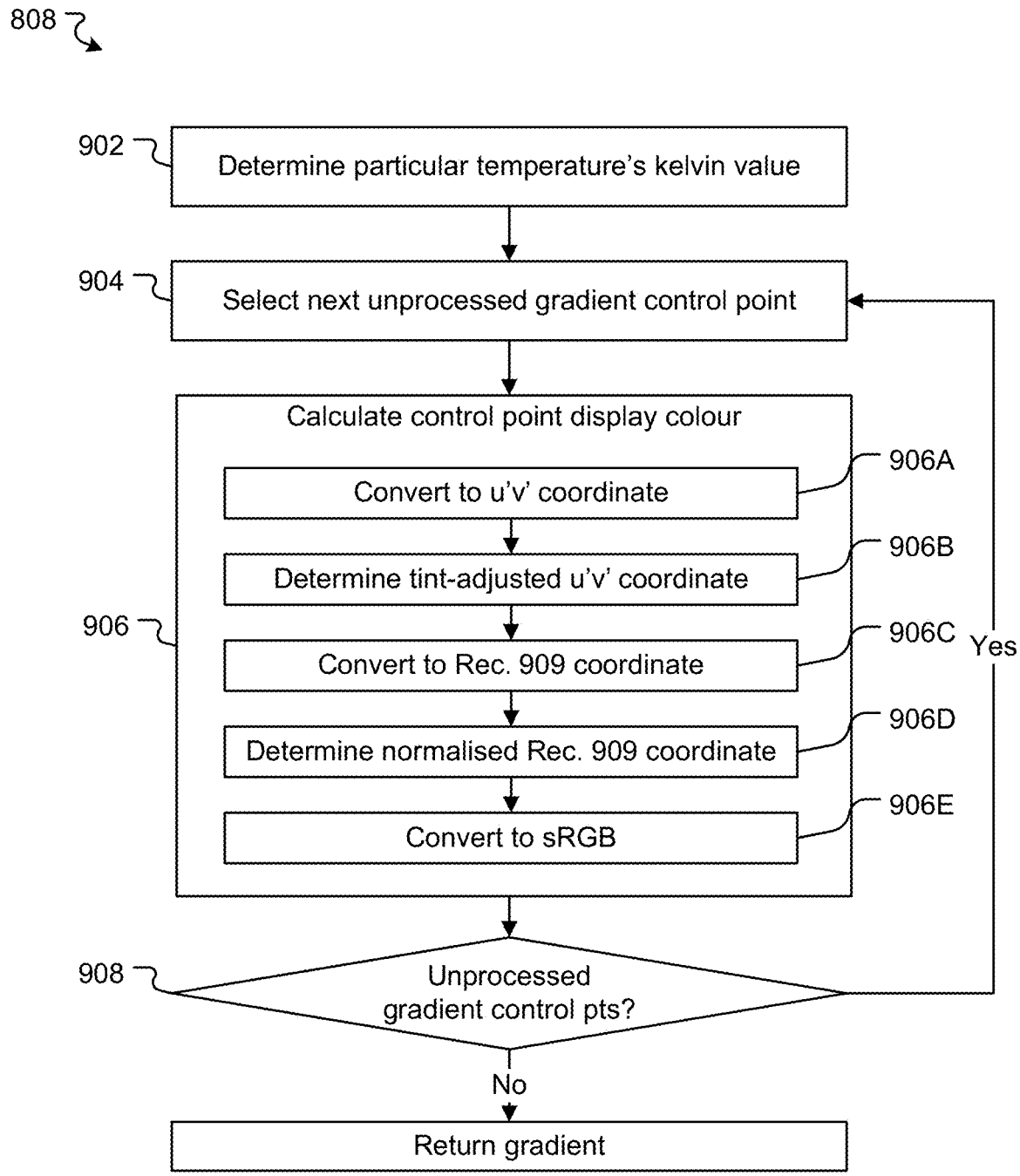
FIG. 9 is a flowchart depicting processing involved in determining a tint path gradient.

The processing performed in the example processing of FIGS. 7 and 9 makes use of the following terms and concepts:

- Colour temperature: The colour of an object (measured in kelvins) at a specific temperature. Low temperatures result in 'warm' colours (red, orange), and very high temperatures result in 'cool' colours (blue).
- Mired: A micro-reciprocal-degree. This unit is used for measuring the perceived coolness or warmth of a colour due to its perceptual uniformity. Equal changes on the mired scale are perceived as equal amounts warmer/cooler.
- White balance: The RGB (red, green, blue) ratios of a white object in a digital image.
- Planckian locus: The set of colours of all blackbody radiators. It is a range of colours varying from deep red to blue-white.
- CIE xy and xyY: The CIE xy diagram represents all colours humans can perceive. It only includes two dimensions and, therefore, is able to represent colour but not brightness. The CIE xyY colour space extends xy with a luminosity component and, therefore, is able to represent both colour (xy) and brightness (Y).
- CIE XYZ: CIE XYZ is a foundational colour space which is used when converting between other colour spaces. Most other colour spaces are defined in terms of a transformation from XYZ.
- CIE u'v': The CIE u'v' colour space is a linear transformation of CIE xy which attempts to make equal distances in the space appear as equally different colours. For this reason, it is often used to determine colour differences.
- REC.709: REC.709 is a standard for image encoding and signal characteristics. In the present disclosure, the term REC.709 is used to refer to the REC.709 colour gamut, and linear light levels. The colour gamut of REC.709 and sRGB are identical, but their EOTFs (Electro-optical transfer functions) differ. Accordingly, reference to REC.709 may be considered reference to linear sRGB.

At 702, application 104 selects the next unprocessed gradient control point 602—i.e. a control point for which a display colour has not yet been determined. Application 104 may be configured to process control points 602 in any order, or in parallel.

At 704, application 104 determines a corresponding kelvin value (e.g. a colour temperature) for the selected gradient control point 602. In the present embodiments, in order to determine the corresponding kelvin value for a selected gradient control point, application 104 invokes what will be referred to as a warmthToTemperature function.

The warmthToTemperature function of the present embodiments takes an input value in the range −1<=input value <=1 (e.g. the temperature input value that the selected gradient control point 602 corresponds to) and returns a corresponding kelvin value (in this example, a value in the range 5,298 to 8,421 kelvin, though alternative ranges may be used).

In the present example, the kelvin range of 5,298 to 8,421 is based on several factors—e.g. the mired value that corresponds to the white point of sRGB (roughly 6,504 Kelvin) and the desire for a white balance slider control that behaves such that the positive and negative ranges feel roughly equal in their influence of the colour (avoiding, for example, a scenario where a positive temperature makes an image much warmer but a negative temperature only makes the image marginally more blue). In pursuit of this, the positive and negative mired ranges for the slider should be equal, as this is roughly perceptually uniform. Here a mired range of +/−35 from an origin of 154 mired is used. The extent of our mired shift and the strength of the bias towards or away from the magenta focal point are also limited by the working colour space. In the present examples, sRGB (which has the same range of colours as REC.709) is used and, accordingly, a colour outside this range cannot be output. Alternative implementations may use a larger working colour space and therefore be able to make use of a wider range of colour temperature values and intensities of tint bias.

The warmthToTemperature function of the present embodiments operates so that input values that are close to −1 result in cool tones (high colour temperatures) and input values that are close to 1 result in warm tones (low colour temperatures). Furthermore, the warmthToTemperature function makes use of the micro-reciprocal-degree (mired) unit to make equal changes in the input value range of −1 to 1 appear as equal differences in warmth.

The warmthToTemperature function of the present embodiments makes use of the following values:

- A white point temperature value. This is a predefined value, set as 6,504 (the temperature of the white point of the sRGB colour space).
- A greyMired value. This is the mired value of the white point temperature value. The greyMired value may be a predefined value of approximately 154. Alternatively, the greyMired value may be calculated by a degreeToMired function which takes as input a temperature value and returns 1,000,000 divided by the input temperature value. In this example, 1,000,000/6,504 (the white point temperature value)=153.75.
- A coolMired value which defines the mired value for the "cool" extremity—e.g. 8,421 Kelvin in this example. The coolMired value may be a predefined value—in the present example approximately 119. Alternatively, the coolMired value may be calculated by the above mentioned degreeToMired function (1,000,000/8,421=118.75) or by subtracting a miredRange value (in this case 35) from the greyMired value (approx. 154).
- A warmMired value which defines the mired value for the "warm" extremity—e.g. 5,298 Kelvin in this example. The warmMired value may be a predefined value—in the present example approximately 189. Alternatively, the warmMired value may be calculated by the above mentioned degreeToMired function (1,000,000/5,298=188.75) or by adding the miredRange value (in this case 35) to the greyMired value (approx. 154).

If the input value input to the warmthToTemperature function is 0, the function returns the white point temperature value (in this example 6,504).

If the input value to the warmthToTemperature function is less than 0, the function determines a mired value by linearly interpolating between the coolMired value (e.g. 84) and the greyMired value (in e.g. 154), then converts that mired value to a kelvin value and returns the result. A mired value may be converted to a kelvin value as follows: kelvin value=1,000,000/mired value.

If the input value to the warmthToTemperature function is greater than 0, the function determines a mired value by linearly interpolating between the greyMired value (e.g. 154) and the warmMired value (e.g. 224), then converts that mired value to kelvin and returns the result.

In present embodiment, a corresponding temperature for each gradient control point is calculated at 706. In alternative embodiments, corresponding temperatures may be pre-calculated and included in the application code as predefined variables (or otherwise stored in a data structure and referenced by application 104 as needed). E.g.:

| Gradient control point | Corresponding temp. input value | Corresponding kelvin value (e.g. as calculated per 704) | Mired value |
|---|---|---|---|
| 1 (602A) | −1 | 8420.94 | 118.75 |
| 2 (602B) | −0.667 | 7667.64 | 130.42 |
| 3 (602C) | −0.333 | 7038.05 | 142.08 |
| 4 (602D) | 0 | 6504 | 153.75 |
| 5 (602E) | 0.333 | 6045.28 | 165.42 |
| 6 (602F) | 0.667 | 5647.01 | 117.08 |
| 7 (602G) | 1 | 5297.97 | 188.75 |

At 706, application 104 calculates a display colour for the selected gradient control point. The display colour is calculated based on the gradient control point's kelvin value (as determined at 704) and the new tint value (as adjusted at 504).

In the present embodiments, in order to calculate the display colour for a particular gradient control point, application 104 invokes what will be referred to as a temperatureToWhitePoint function. The temperatureToWhitePoint function of the present embodiments takes as input a kelvin value (5,298<=kelvin value <=8,421 in the present example) and a tint value (−1<=tint <=1 in the present example) and returns an sRGB coordinate that represents the target white point (i.e. the display colour) for the selected gradient control point.

When invoked at 706, the inputs to the temperatureToWhitePoint function are the kelvin value corresponding to the selected gradient control point (as determined at 704) and the tint value as adjusted at 504.

The temperatureToWhitePoint function of the present embodiments involves five general stages (706A to 706E) which will be described in turn.

At 706A, application 104 converts the input kelvin value to a corresponding CIE u'v' coordinate. In the present embodiments, application 104 does this by: converting the input kelvin value to a CIE xy coordinate, and then converting that CIE xy coordinate to a CIE u'v' coordinate.

Converting an input kelvin value to a CIE xy coordinate may be performed using known techniques, for example using cubic splines as described in U.S. Pat. No. 7,024,034. Generally speaking, this involves approximating the CIE xy coordinate that results from the input kelvin value based on the Planckian locus curve (which, in turn, is approximated using a set of polynomials that are selected based on the input kelvin value.

Converting a CIE xy coordinate to a CIE u'v' coordinate may be performed using known techniques. Generally speaking, this involves a linear transformation of the xy coordinate.

Figure 10:
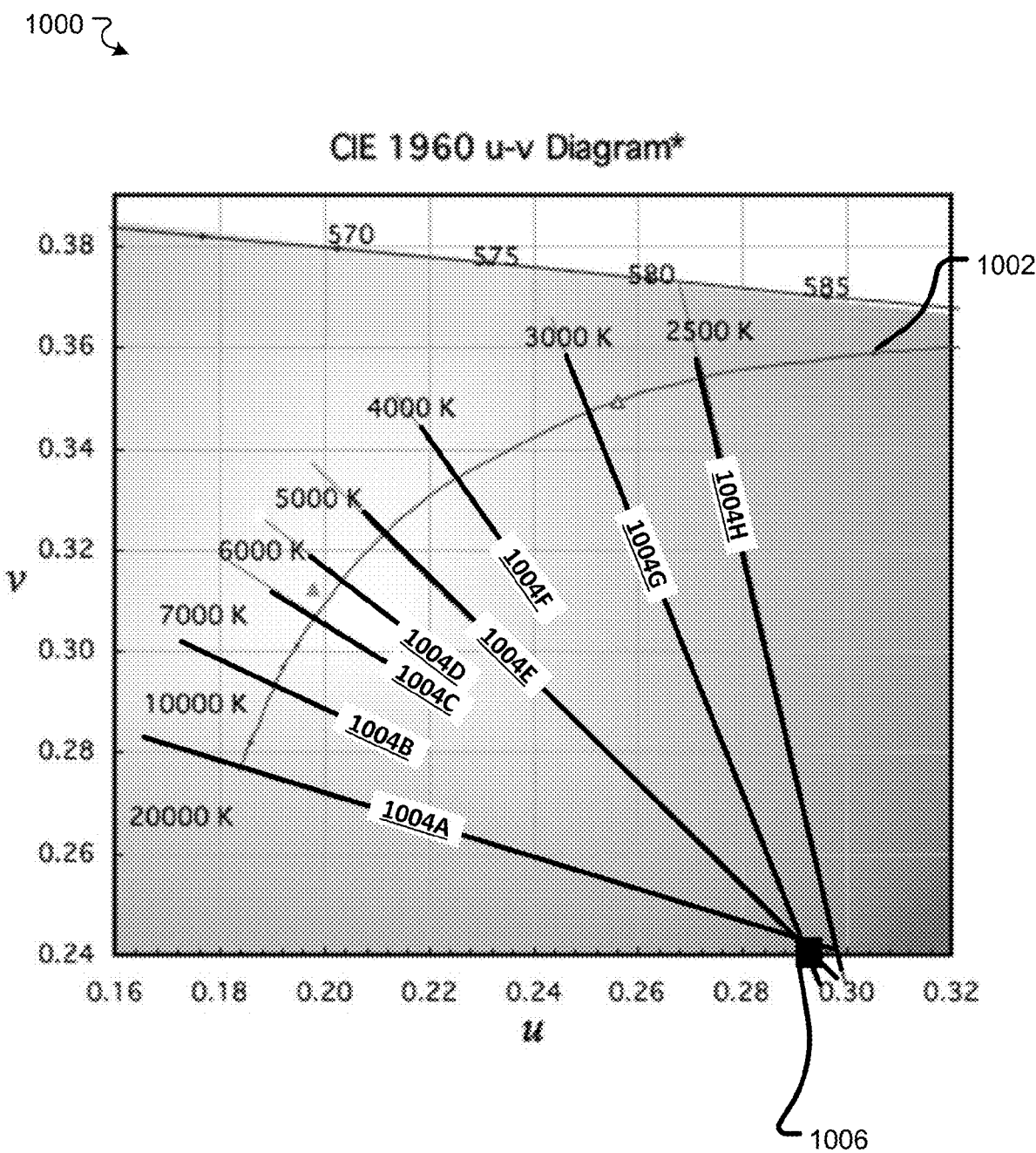
FIG. 10 depicts the CIE 1960 u-v colour space.

At 706B, application 104 determines what will be referred to as a tint-adjusted u'v' coordinate. To assist in describing this, FIG. 10 provides a depiction 1000 of the CIE 1960 u-v colour space (with v coordinates on the vertical axis and u coordinates on the x axis). FIG. 10 is adapted from the paper "Calculation of CCT and Duv and Practical Conversion Formulae" by Yoshi Ohno, presented at the CORM 2011 Conference, Gaithersburg, MD, May 3-5, 2011. In FIG. 10: curve 1002 indicates the Planckian locus; straight lines 1004A to 1004H (that intersect the Planckian locus curve 1002) indicate tint; and fixed point 1006 indicates a fixed magenta colour anchor point (which, in the present embodiments, has a u'v' coordinate of [0.292, 0.24]). Tint can be relatively accurately approximated by mixing between the fixed magenta colour anchor point 1006 and a point on the Planckian locus (curve 1002).

To determine the tint-adjusted u'v' coordinate, application 104 linearly interpolates between the original u'v' coordinate (determined at 706A) and the fixed magenta colour (1006 in FIG. 10). To do so, the tint anchor point is defined (here [0.292, 0.24] in u'v') and an interpolation strength is defined (in the present examples 1+/−(⅙*tint)). This results in a range of values between 0.8333 and 1.1666. This range provides control to adjust tint without being so sensitive as to make images appear wrong when pushed to the extremities. Linear interpolation between the fixed magenta anchor point and the original u'v' coordinate (determined at 706A) results in a tint-adjusted u'v' coordinate that is either further away from or closer to the magenta anchor point than the original u'v' coordinate was.

At 706C, application 104 converts the tint-adjusted u'v' coordinate (determined at 706B) to a REC.709 colour space coordinate. In the present embodiments, application 104 does this by: converting the tint-adjusted u'v' coordinate (determined at 706B) to a CIE xy coordinate; converting the CIE xy coordinate to a CIE xyY coordinate; converting the CIE xyY coordinate to a CIE XYZ coordinate; converting the CIE XYZ coordinate to REC.709. These conversions may be performed using known techniques.

At 706D, application 104 normalises the REC.709 coordinate determined at 706C. Application 104 is configured to perform this normalisation so that the colours provided to the shader that is responsible for applying the white balancing to each pixel are consistent. Generally speaking, normalisation at 706D involves determining the largest RGB component of the REC.709 coordinate (determined at 706C) and dividing each of the RGB components of the REC.709 coordinate by that largest value so that the maximum component value is 1.

In the present implementation, the shader responsible for applying the white balancing to each pixel takes sRGB values as input. Accordingly, at 706E application 104 converts the normalised REC.709 coordinate (determined at 706D) to a sRGB coordinate. This may be performed using known techniques. For example, application 104 may perform the conversion of raising each component of the input REC.709 RGB coordinate to a defined power (e.g. 1/1.2).

In the present embodiments, the sRGB coordinate determined at 706E is the display colour for the particular gradient control point that is being processed.

At 708, application 104 determines if there are any unprocessed gradient control points—e.g. any gradient control point for which a display colour has not yet been calculated. If so, processing returns to 702. If not, processing proceeds to 710.

At 710, display colours for all gradient control points (and, therefore, the gradient as a whole) have been determined. Accordingly, application 104 returns the gradient that has been determined. The gradient may be returned as an array of colours (e.g. an array of sRGB triplets) or as any other appropriate dataset.

Displaying an Adaptive Tint Adjustment Interface

Figure 8:
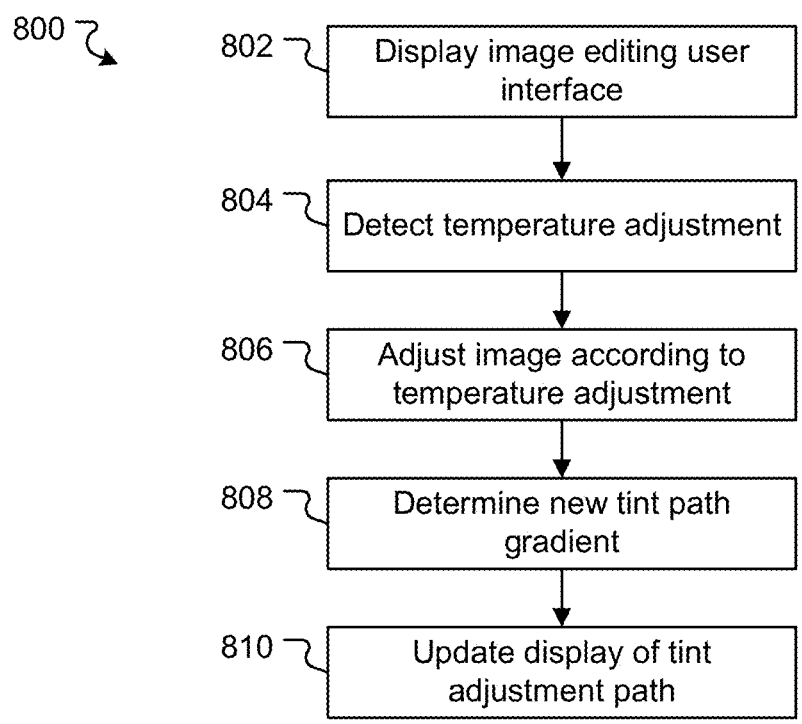
FIG. 8 is a flowchart depicting processing involved in displaying an adaptive tint adjustment control.

Turning to FIG. 8, a computer implemented method 800 for displaying an adaptive tint adjustment interface will be described. Method 800 will be described as being performed by application 104. Method 800 will be described with reference to GUI 300 as described above to illustrate various user interface components.

At 802, application 104 displays an image editing UI such as UI 300 described above. In the present example, displaying the image editing UI includes displaying the image 310 that is being processed and displaying an adaptive tint adjustment interface 410.

The adaptive tint adjustment interface 410 includes a tint adjustment path (e.g. path 414). At 802, application 104 displays the tint adjustment path with an initial tint path gradient (which may be referred to as a first tint path gradient). The initial tint path gradient is based on an initial temperature value (which may be referred to as a first temperature value). The initial temperature value may be determined in various ways. For example, the initial temperature value may be: a default temperature value; a temperature value that application 104 is configured to automatically calculate based on the image 310 being processed; or a temperature value that a user has set in previous adjustment operations performed on the image 310 that is being processed.

Where the initial temperature value is a default temperature value, the initial tint path gradient may be a default tint path gradient that corresponds to that temperature value (or that application 104 determines based on the initial temperature value, e.g. as described below). If the initial temperature value is not a default temperature value, application 104 may determine the initial tint path gradient based on the initial temperature value (e.g. as described below) before the tint adjustment path 414 can be completely displayed.

At 804, application 104 detects a temperature adjustment that changes the initial temperature value to a new temperature value (which may be referred to as a second temperature value). Various temperature adjustments are possible. For example, application 104 may automatically perform the temperature adjustment based on processing performed on the image 310 or responsive to other image adjustments that are performed by a user. Additionally, or alternatively, the temperature adjustment may be the result of user interaction with a temperature adjustment interface such as 400 described above. User interaction with temperature adjustment interface may include, for example, user input that repositions the temperature adjustment handle 406 on the temperature adjustment path 404 or user input that enters a new temperature input value into the temperature adjustment textbox 408.

At 806, in response to detecting the temperature adjustment, application 104 adjusts the image according to the new temperature value. Adjustment of the image based on a particular temperature value may be performed in accordance with known white balancing techniques.

At 808, also in response to detecting the temperature adjustment, application 104 determines a new tint path gradient (which may be referred to as a second tint path gradient). The new tint path gradient is determined based on the new temperature value. Determination of a tint path gradient based on a particular temperature value is described below with reference to FIG. 9.

At 810, following determination of the new tint path gradient, application 104 updates the tint adjustment path 416 so it is displayed with the new tint path gradient. This processing is similar to the processing described above with reference to 510, except application 104 is updating display of the tint adjustment path 416 rather than the temperature adjustment path 406.

At 808 above, application 104 determines a tint path gradient based on a particular temperature value. This will be described with reference to FIG. 9. In the present embodiment, application 104 determines the tint path gradient by calculating display colours for a plurality of gradient control points. Each gradient control point is ultimately associated with a particular position on the tint adjustment path 414.

More specifically, in the present embodiment application 104 is configured to define a tint path gradient using seven control points. The table below indicates the tint input value that each gradient control point maps to along with the physical position of the control point 602 on the tint adjustment path 414 (in this instance expressed as a % of the path's total length):

| Control point | Corresponding tint input value | Position of control point along tint adjustment path 414 (L to R) |
| --- | --- | --- |
| 1 | −1 | 0% |
| 2 | −0.667 | 16.66% |
| 3 | −0.333 | 33.33% |
| 4 | 0 | 50% |
| 5 | 0.333 | 66.66% |
| 6 | 0.667 | 83.33% |
| 7 | 1 | 100% |

While the present embodiments use seven gradient control points to define a tint path gradient, application 104 may be configured to define the tint path gradient by an alternative number of control points.

Turning to FIG. 9, example processing performed by application 104 to determine a tint path gradient based on a particular temperature value (as performed, for example, at 808) will be described.

At 902, application 104 determines a kelvin value that corresponds to the particular temperature value (e.g. the temperature value as adjusted at 804). In the present embodiments, this is performed by passing the particular temperature value as input to warmthToTemperature function described above with reference to 704.

At 904, application 104 selects the next unprocessed gradient control point—i.e. a control point for which a display colour has not yet been determined. Application 104 may be configured to process control points in any order, or in parallel.

At 906, application 104 calculates a display colour for the selected control point. In the present embodiments, this is performed by passing the kelvin value determined at 902 and the tint input value that the control point corresponds to (see, for example, table above) to the temperatureToWhitePoint function described above with reference to 706. This returns an sRGB coordinate which is the display colour for the selected control point.

At 908, application 104 determines if there are any unprocessed gradient control points—e.g. any gradient control point for which a display colour has not yet been calculated. If so, processing returns to 904. If not, processing proceeds to 910.

At 910, display colours for all gradient control points (and, therefore, the tint path gradient) have been determined. Accordingly, application 104 returns the gradient that has been determined. The gradient may be returned as an array of colours (e.g. an array of sRGB triplets) or as any other appropriate dataset.

Figure 11:
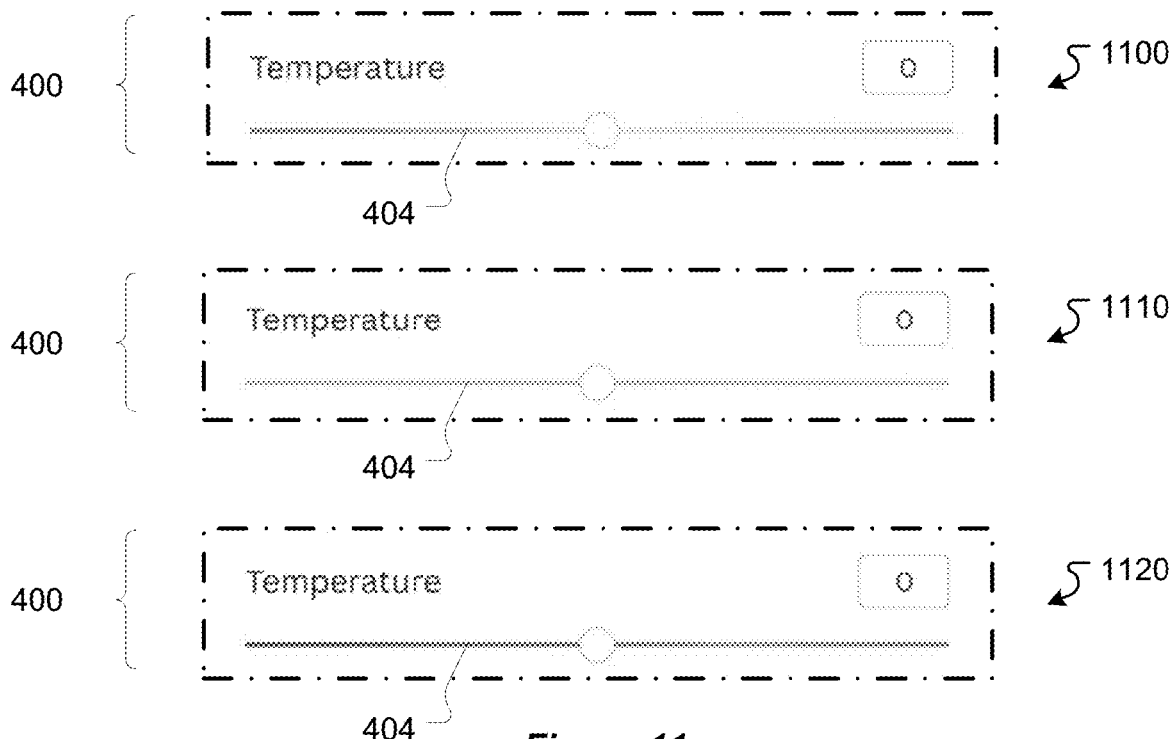
FIG. 11 provides example temperature adjustment user interfaces.

In order to illustrate the features of the present disclosure, FIG. 11 provides three colour examples of temperature adjustment user interfaces 400. Each example of FIG. 11 depicts the temperature adjustment path 404 with a gradient that is determined based on a particular tint value. The table below indicates the particular tint value that each example is based on, and the gradient of the temperature adjustment path that application 104 has determined for that particular tint value. The particular tint value is indicated as a tint input value in the context of the example tint adjustment interface 410 described above (in these examples a value of between −1 and 1).

| Example | Tint value | Temperature adjustment path gradient in sRGB hex format (L to R) |
|---|---|---|
| 1100 | Tint input value 0 | [#97b2eb, #acc1eb, #c8d4eb, #ebebeb, #ebdcc7, #ebcea7, #ebc18c] |
| 1110 | Tint input value −1 | [#86d5eb, #a3ebe7, #b4ebc9, #c6ebaa, #d9eb88, #ebea60, #ebd813] |
| 1120 | Tint input value 1 | [#a293eb, #b09deb, #c2a9eb, #d8b4eb, #ebbce6, #ebb3cf, #ebaabb] |

Figure 12:
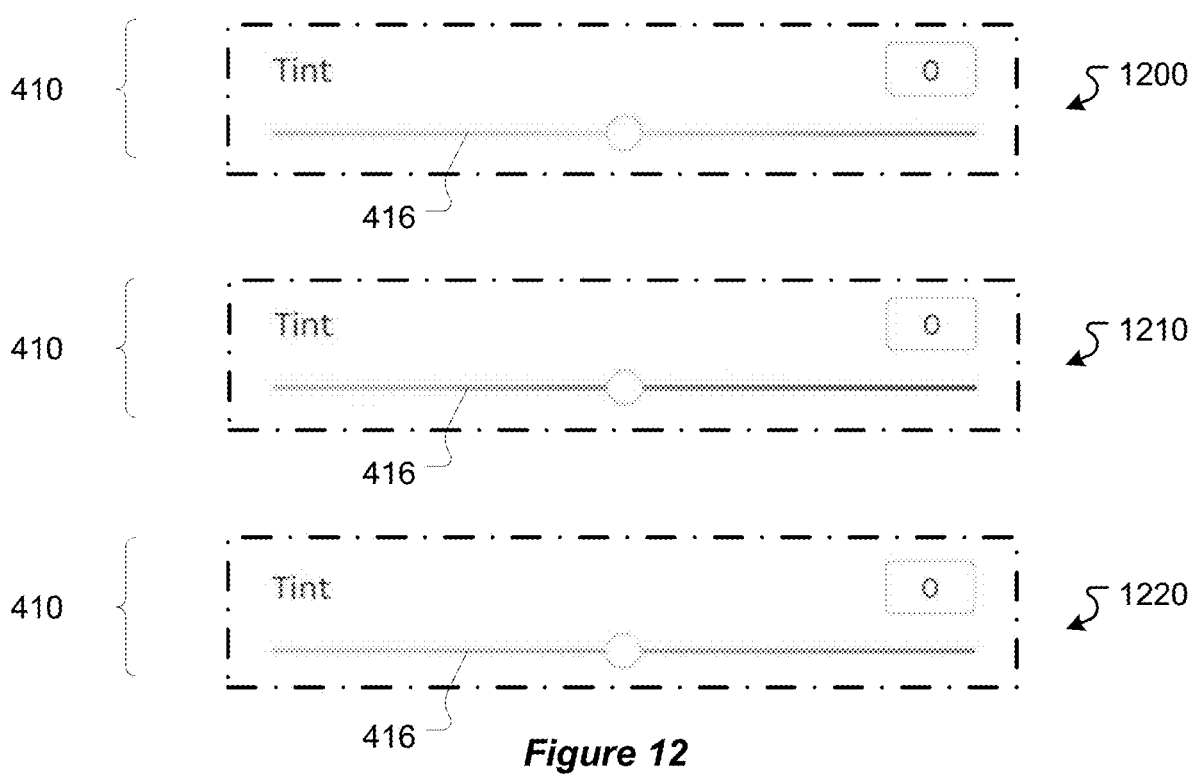
FIG. 12 provides example tint adjustment user interfaces.

To further illustrate the features of the present disclosure, FIG. 12 provides three colour examples of tint adjustment user interfaces 410. Each example of FIG. 12 depicts the tint adjustment path 416 with a gradient that is determined based on a particular temperature value. The table below indicates the particular temperature value that each example is based on, and the gradient of the tint adjustment path that application 104 has determined for that particular temperature value. The particular temperature value is indicated both as a kelvin value and as a temperature input value in the context of the example temperature adjustment interface 400 described above (in these examples a value of between −1 and 1).

| Example | Temperature value | Tint adjustment path gradient in sRGB hex format (L to R) |
|---|---|---|
| 1200 | Temperature input value 0 | [#c6ebaa, #d2ebbf, #deebd5, #ebebeb, #e3d6eb, #ddc4eb, #d8b4eb] |
| 1210 | Temperature input value −1 | [#86d5eb, #8dc9eb, #92bdeb, #97b2eb, #9ba7eb, #9f9deb, #a293eb] |
| 1220 | Temperature input value 1 | [#ebd813, #ebd057, #ebc976, #ebc18c, #ebba9e, #ebb2ae, #ebaabb] |

In the above embodiments, both a temperature adjustment interface 400 and a tint adjustment interface 410 are provided. In alternative embodiments, however, only one or the other of these interfaces may be displayed.

For example, in certain embodiments, only an adaptive temperature adjustment interface 400 as described above may be provided. In this case, an alternative mechanism for adjusting tint may be provided (e.g. a text entry box or other mechanism), or no mechanism for adjusting tint may be provided (in which case application 104 may be configured to automatically determine and set a tint value for the image being processed).

Alternatively, in certain embodiments, only an adaptive tint adjustment interface 410 as described above may be displayed. In this case, an alternative mechanism for adjusting temperature may be provided (e.g. a text entry box or other mechanism), or no mechanism for adjusting temperature may be provided (in which case application 104 may be configured to automatically determine and set a temperature value for the image being processed).

In the above embodiments, application 104 determines a new temperature path gradient at 508 by calculating gradient control points (per FIG. 7). In alternative embodiments, application 104 may determine a new temperature path gradient at 508 by using the new tint value (as adjusted at 504) to retrieve a pre-calculated temperature path gradient. For example, application 104 (or an alternative application) may pre-calculate a plurality of temperature path gradients based on a plurality of predefined tint input values. Each temperature path gradient may, for example, be calculated by performing the operations described above with reference to FIG. 7 for one of the predefined tint input values. Each pre-calculated temperature path gradient is then associated with a range of tint input values in an appropriate data structure. Any appropriate data structure may be used, for example a lookup table such as the first two columns of the following:

| Tint input value (T) | Temperature path gradient | Gradient calculated, for example, using tint input value of: |
|---|---|---|
| $-1 <= T < -0.75$ | $[CP_{1\text{-}1}, \ldots, CP_{1\text{-}n}]$ | $-1$ |
| $-0.75 <= T < -0.5$ | $[CP_{2\text{-}1}, \ldots, CP_{2\text{-}n}]$ | $-0.75$ |
| $-0.5 <= T < -0.25$ | $[CP_{3\text{-}1}, \ldots, CP_{3\text{-}n}]$ | $-0.5$ |
| $-0.25 <= T < 0$ | $[CP_{4\text{-}1}, \ldots, CP_{4\text{-}n}]$ | $-0.25$ |
| $0 <= T < 0.25$ | $[CP_{5\text{-}1}, \ldots, CP_{5\text{-}n}]$ | $0$ |
| $0.25 <= T < 0.5$ | $[CP_{6\text{-}1}, \ldots, CP_{6\text{-}n}]$ | $0.25$ |
| $0.5 <= T < 0.75$ | $[CP_{7\text{-}1}, \ldots, CP_{7\text{-}n}]$ | $0.5$ |
| $0.75 <= T <= 1.0$ | $[CP_{8\text{-}1}, \ldots, CP_{8\text{-}n}]$ | $0.75$ |

In such embodiments, when application 104 detects a tint input value adjustment (e.g. per 504 above), application 104 may determine the new temperature path gradient (at 508) by using the new tint input value to retrieve the associated (pre-calculated) temperature path gradient from the data structure.

In the example table above, eight pre-calculated temperature path gradients are shown. Additional or fewer pre-calculated temperature path gradients could be used. The more gradients that are pre-calculated (and the smaller the tint input value range that each gradient corresponds to), however, the more accurate the temperature path gradient selected and displayed in response to an actual tint input value will be.

In the above embodiments, application 104 determines a new tint path gradient at 808 by calculating gradient control points (per FIG. 9). In alternative embodiments, application 104 may determine a new tint path gradient at 808 by using the new temperature value (as adjusted at 804) to retrieve a pre-calculated tint path gradient. For example, application 104 (or an alternative application) may pre-calculate a plurality of tint path gradients based on a plurality of predefined temperature input values. Each tint path gradient may, for example, be calculated by performing the operations described above with reference to FIG. 9 for one of the predefined temperature input values. Each pre-calculated tint path gradient is then associated with a range of temperature input values in an appropriate data structure. Any appropriate data structure may be used, for example a lookup table such as the first two columns of the following:

| Temperature input value (T) | Tint path gradient | Gradient calculated, for example, using temperature input value of: |
|---|---|---|
| $-1 <= T < -0.75$ | $[CP_{1\text{-}1}, \ldots, CP_{1\text{-}n}]$ | $-1$ |
| $-0.75 <= T < -0.5$ | $[CP_{2\text{-}1}, \ldots, CP_{2\text{-}n}]$ | $-0.75$ |
| $-0.5 <= T < -0.25$ | $[CP_{3\text{-}1}, \ldots, CP_{3\text{-}n}]$ | $-0.5$ |
| $-0.25 <= T < 0$ | $[CP_{4\text{-}1}, \ldots, CP_{4\text{-}n}]$ | $0.25$ |
| $0 <= T < 0.25$ | $[CP_{5\text{-}1}, \ldots, CP_{5\text{-}n}]$ | $0$ |
| $0.25 <= T < 0.5$ | $[CP_{6\text{-}1}, \ldots, CP_{6\text{-}n}]$ | $0.25$ |
| $0.5 <= T < 0.75$ | $[CP_{7\text{-}1}, \ldots, CP_{7\text{-}n}]$ | $0.5$ |
| $0.75 <= T <= 1.0$ | $[CP_{8\text{-}1}, \ldots, CP_{8\text{-}n}]$ | $0.75$ |

In such embodiments, when application 104 detects a temperature input value adjustment (e.g. per 804 above), application 104 may determine the new temperature path gradient (at 808) by using the new temperature input value to retrieve the associated (pre-calculated) tint path gradient from the data structure.

In the example table above, eight pre-calculated tint path gradients are shown. Additional or fewer pre-calculated tint path gradients could be used. The more gradients that are pre-calculated (and the smaller the temperature input value range that each gradient corresponds to), however, the more accurate the tint path gradient selected and displayed in response to an actual temperature input value will be. Furthermore, in alternative embodiments instead of using one particular pre-calculated gradient for a given range of input values it may be possible to interpolate between the two nearest gradients.

Additional, specific embodiments of the present disclosure are described in the following clauses by way of non-limiting example:

Clause 1. A computer implemented method for adjusting an image, the method including:
  displaying the image;
  displaying a first adjustment interface, the first adjustment interface including a first adjustment path and a first control for adjusting a first image processing parameter, the first adjustment path displayed with a first gradient that is determined based on a first value of a second image processing parameter; and
  detecting a parameter adjustment that adjusts the first value of the second image processing parameter to a second value of the second image processing parameter; and
  in response to detecting the parameter adjustment:
  adjusting the image according to the second value of the second image processing parameter;
  determining a second gradient for the first adjustment path based on the second value of the second image processing parameter; and updating the first adjustment path to be displayed with the second gradient.

Clause 2. The computer implemented method of clause 1, wherein:
  the first adjustment interface is a temperature adjustment interface;
  the first image processing parameter is a colour temperature parameter; and
  the second image processing parameter is a tint parameter.

Clause 3. The computer implemented method of clause 2, wherein determining the second gradient includes determining display colours for a plurality of second gradient control points.

Clause 4. The computer implemented method of clause 3, wherein determining a particular display colour for a particular second gradient control point includes:
  determining a colour temperature that the particular second gradient control point corresponds to; and
  determining the particular display colour for the particular second gradient control point based on the colour temperature that the particular second gradient control point corresponds to and the second value of the second image processing parameter.

Clause 5. The computer implemented method of clause 1, wherein:
  the first adjustment interface is a tint adjustment interface;
  the first image processing parameter is a tint parameter; and
  the second image processing parameter is a colour temperature parameter.

Clause 6. The computer implemented method of clause 5, wherein determining the second gradient includes determining display colours for a plurality of second gradient control points.

Clause 7. The computer implemented method of clause 6, wherein determining a particular display colour for a particular second gradient control point includes:
  determining a colour temperature that the second value of the second image processing parameter corresponds to; and
  determining the particular display colour for the particular second gradient control point based on the colour temperature that the second value of the second image processing parameter corresponds to and a tint input value that the particular second gradient control point corresponds to.

Clause 8. The computer implemented method of any one of clauses 3, 4, 6, or 7, wherein updating the first adjustment path to be displayed with the second gradient includes:
  positioning the plurality of second gradient control points along the first adjustment path; and
  interpolating colours between each adjacent pair of second gradient control points.

Clause 9. The computer implemented method of clause 1, wherein determining the second gradient includes using the second value of the second image processing parameter to retrieve a pre-calculated gradient.

Clause 10. The computer implemented method of any one of clauses 1 to 9, wherein the first adjustment interface is a slider-type interface and the first control is a handle that is movable along the first adjustment path.

Clause 11. The computer implemented method of any one of clauses 1 to 10, wherein the first adjustment interface further includes a first adjustment textbox for receiving input that adjusts the first image processing parameter.

Clause 12. The computer implemented method of any one of clauses 1 to 11, wherein detecting the parameter adjustment includes detecting user interaction with a second adjustment interface.

Clause 13. The computer implemented method of clause 12, wherein:
  the second adjustment interface includes a second adjustment path and a second control for adjusting the second image processing parameter; and
  the second adjustment path is displayed with a third gradient that is determined based on a value of the first image processing parameter;

Clause 14. A computer implemented method for adjusting an image, the method including: displaying the image;

displaying a temperature adjustment interface, the temperature adjustment interface including a temperature adjustment path and a first control for adjusting a colour temperature parameter, the temperature adjustment path displayed with a first gradient that is determined based on a first value of a tint parameter; and detecting a parameter adjustment that adjusts the first value of the tint parameter to a second value of the tint parameter; and in response to detecting the parameter adjustment:

adjusting the image according to the second value of the tint parameter;

determining a second gradient for the temperature adjustment path based on the second value of the tint parameter; and updating the temperature adjustment path to be displayed with the second gradient.

Clause 15. A computer implemented method for adjusting an image, the method including: displaying the image;

displaying a tint adjustment interface, the tint adjustment interface including a tint adjustment path and a first control for adjusting a tint parameter, the tint adjustment path displayed with a first gradient that is determined based on a first value of a colour temperature parameter; and detecting a parameter adjustment that adjusts the first value of the colour temperature parameter to a second value of the colour temperature parameter; and in response to detecting the parameter adjustment:

adjusting the image according to the second value of the colour temperature parameter;

determining a second gradient for the tint adjustment path based on the second value of the colour temperature parameter; and updating the tint adjustment path to be displayed with the second gradient.

Clause 16. A computer processing system including:

a processing unit; and a non-transient computer-readable storage medium storing instructions, which when executed by the processing unit, cause the processing unit to perform a method according to any one of clauses 1 to 15.

Clause 17. A non-transient storage medium storing instructions executable by a processing unit to cause the processing unit to perform a method according to any one of clauses 1 to 15.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required otherwise by context, the terms "first", "second", etc. are used to differentiate between various elements and features and not in an ordinal sense. For example, a first gradient could be termed a second gradient, and, similarly, a second gradient could be termed a first gradient, without departing from the scope of the various described examples. By way of further example, in certain cases a second gradient could occur before a first gradient (or without a first gradient existing).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for adjusting an image, the method including:

displaying an editing user interface (UI), wherein the editing UI includes:

a preview region in which the image is displayed;

a first adjustment interface that can be used to adjust a value of a first image processing parameter for the image, wherein the first adjustment interface is a slider type interface that includes a first adjustment path and a first control that is moveable along the first adjustment path to adjust the value of the first image processing parameter, and wherein a first colour gradient is displayed along the first adjustment path, the first colour gradient being determined based on a first value of a second image processing parameter that has been set for the image; and a first UI element, wherein the first UI element is distinct from the first adjustment interface and the image displayed in the preview region;

detecting a parameter adjustment that adjusts the first value of the second image processing parameter to a second value of the second image processing parameter; and in response to detecting the parameter adjustment:

adjusting the image displayed in the preview region of the editing user interface according to the second value of the second image processing parameter;

determining a second colour gradient for the first adjustment path based on the second value of the second image processing parameter;

displaying the second colour gradient along the first adjustment path instead of the first colour gradient, and wherein an appearance of the first UI element is not changed in response to detecting the parameter adjustment.

2. The computer implemented method of claim 1, wherein:
the first adjustment interface is a colour temperature adjustment interface;
the first image processing parameter is colour temperature; and
the second image processing parameter is tint.

3. The computer implemented method of claim 1, wherein determining the second colour gradient includes determining display colours for a plurality of second colour gradient control points.

4. The computer implemented method of claim 3, wherein determining a particular display colour for a particular second colour gradient control point includes:
determining a colour temperature that the particular second colour gradient control point corresponds to; and
determining the particular display colour for the particular second colour gradient control point based on the colour temperature that the particular second colour gradient control point corresponds to and the second value of the second image processing parameter.

5. The computer implemented method of claim 1, wherein:
the first adjustment interface is a tint adjustment interface;
the first image processing parameter is tint; and
the second image processing parameter is colour temperature.

6. The computer implemented method of claim 5, wherein determining the second colour gradient includes determining display colours for a plurality of second colour gradient control points.

7. The computer implemented method of claim 6, wherein determining a particular display colour for a particular second colour gradient control point includes:
determining a colour temperature that the second value of the second image processing parameter corresponds to; and
determining the particular display colour for the particular second colour gradient control point based on the colour temperature that the second value of the second image processing parameter corresponds to and a tint input value that the particular second colour gradient control point corresponds to.

8. The computer implemented method of claim 3, wherein updating the first adjustment path to display the second colour gradient along the first adjustment path includes:
positioning the plurality of second colour gradient control points along the first adjustment path; and
interpolating colours between each adjacent pair of second colour gradient control points.

9. The computer implemented method of claim 1, wherein determining the second colour gradient includes using the second value of the second image processing parameter to retrieve a pre-calculated colour gradient.

10. The computer implemented method of claim 1, wherein the first adjustment interface further includes a first adjustment textbox for receiving input that adjusts the value of the first image processing parameter.

11. The computer implemented method of claim 10, wherein an appearance of the first adjustment textbox of the first adjustment interface is not changed in response to detecting the parameter adjustment.

12. The computer implemented method of claim 1, wherein:
the editing UI further includes a second adjustment interface that can be used to adjust the value of the second image processing parameter for the image; and
detecting the parameter adjustment includes detecting user interaction with the second adjustment interface.

13. The computer implemented method of claim 12, wherein:
the second adjustment interface includes a second adjustment path and a second control for adjusting the second image processing parameter; and
a third colour gradient is displayed along the second adjustment path, the third colour gradient being determined based on the value of the first image processing parameter.

14. The computer implemented method of claim 12, wherein an appearance of the second adjustment interface is not changed in response to detecting the parameter adjustment.

15. The computer implemented method of claim 1, wherein an appearance of the first control of the first adjustment interface is not changed in response to detecting the parameter adjustment.

16. A computer processing system including:
a processing unit; and
a non-transient computer-readable storage medium storing instructions, which when executed by the processing unit, cause the processing unit to perform a method for adjusting an image, the method including:
displaying an editing user interface (UI), wherein the editing UI includes:
a preview region in which the image is displayed;
a first adjustment interface that can be used to adjust a value of a first image processing parameter for the image, wherein the first adjustment interface is a slider type interface that includes a first adjustment path and a first control that is moveable along the first adjustment path to adjust the value of the first image processing parameter, and wherein a first colour gradient is displayed along the first adjustment path, the first colour gradient being determined based on a first value of a second image processing parameter that has been set for the image; and
a first UI element, wherein the first UI element is distinct from the first adjustment interface and the image displayed in the preview region;
detecting a parameter adjustment that adjusts the first value of the second image processing parameter to a second value of the second image processing parameter; and
in response to detecting the parameter adjustment:
adjusting the image displayed in the preview region of the editing user interface according to the second value of the second image processing parameter;
determining a second colour gradient for the first adjustment path based on the second value of the second image processing parameter;
displaying the second colour gradient along the first adjustment path instead of the first colour gradient, and wherein
an appearance of the first UI element is not changed in response to detecting the parameter adjustment.

17. A non-transient storage medium storing instructions executable by a processing unit to cause the processing unit to perform a method for adjusting an image, the method including:

displaying an editing user interface (UI), wherein the editing UI includes:
- a preview region in which the image is displayed;
- a first adjustment interface that can be used to adjust a value of a first image processing parameter for the image, wherein the first adjustment interface is a slider type interface that includes a first adjustment path and a first control that is moveable along the first adjustment path to adjust the value of the first image processing parameter, and wherein a first colour gradient is displayed along the first adjustment path, the first colour gradient being determined based on a first value of a second image processing parameter that has been set for the image; and
- a first UI element, wherein the first UI element is distinct from the first adjustment interface and the image displayed in the preview region;

detecting a parameter adjustment that adjusts the first value of the second image processing parameter to a second value of the second image processing parameter; and in response to detecting the parameter adjustment:
- adjusting the image displayed in the preview region of the editing user interface according to the second value of the second image processing parameter;
- determining a second colour gradient for the first adjustment path based on the second value of the second image processing parameter;
- displaying the second colour gradient along the first adjustment path instead of the first colour gradient, and wherein an appearance of the first UI element is not changed in response to detecting the parameter adjustment.

* * * * *